United States Patent

[11] 3,551,676

| [72] | Inventor | Russell W. Runnels |
| --- | --- | --- |
| | | Rte. No. 1, Wilmington, Ohio 45177 |
| [21] | Appl. No. | 722,737 |
| [22] | Filed | Apr. 19, 1968 |
| [45] | Patented | Dec. 29, 1970 |

[54] AIRCRAFT COLLISION WARNING SYSTEM WITH PANORAMIC VIEWING REFLECTORS
14 Claims, 5 Drawing Figs.

[52] U.S. Cl............................................ 250/83.3, 250/106, 340/25, 340/198, 340/293, 340/294, 340/258, 340/301, 340/303
[51] Int. Cl........................................... G01j 1/28
[50] Field of Search............................. 250/83.3IR, 106VC; 340/25X, 258XB, 258, 198, 303, 301, 293, 294

[56] References Cited
UNITED STATES PATENTS

| 2,430,595 | 11/1947 | Young............................ | 350/198 |
| --- | --- | --- | --- |
| 2,528,590 | 11/1950 | Garlow........................... | 350/303 |
| 2,828,930 | 4/1958 | Herbold......................... | 250/83.3IR |
| 3,113,211 | 12/1963 | Thews........................... | 250/83.3IR |
| 3,383,511 | 5/1968 | Palser............................ | 350/293 |
| 3,436,539 | 4/1969 | Wilcox.......................... | 250/83.3 |
| 3,436,540 | 4/1969 | Lamorlette.................... | 250/83.3IR |

*Primary Examiner*—William F. Lindquist
*Assistant Examiner*—Morton J. Frome
*Attorney*—Pennie, Edmonds, Morton, Taylor and Adams

ABSTRACT: An aircraft warning system adapted to be mounted on an aircraft and to alert the pilot to the presence of nearby aircraft is disclosed. The warning system has a panoramic reflector with coaxial primary and secondary reflecting surfaces of revolution facing each other. One or more radiation detectors is positioned between the reflecting surfaces to receive radiation emitted by other aircraft, and electrical alarm indicator means are connected to the detector to warn the pilot that such radiation is being detected. In another preferred embodiment one or more aircraft beacons is included integrally with the sensor system and means are provided for inhibiting the electrical indicator from responding to radiation emitted by the aircraft's own beacon.

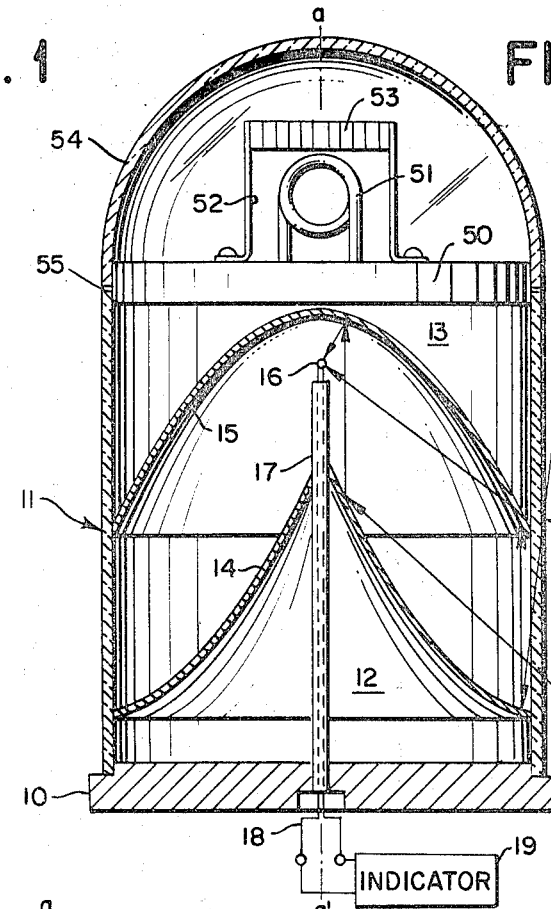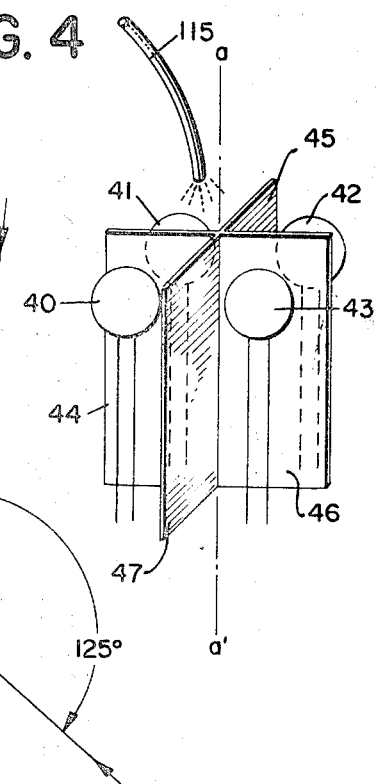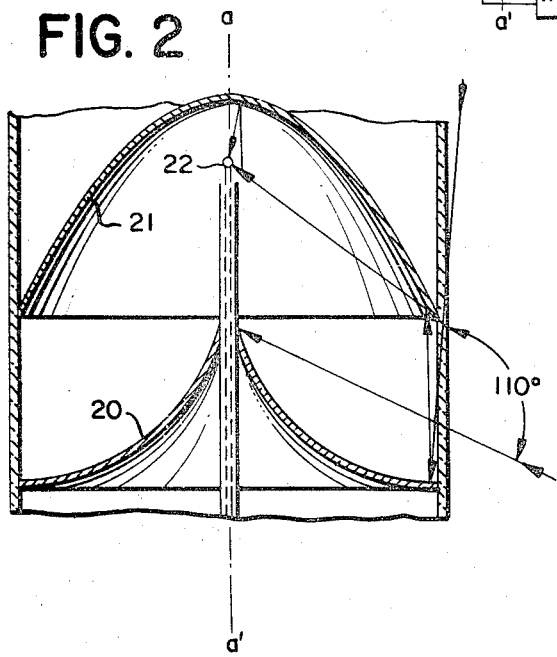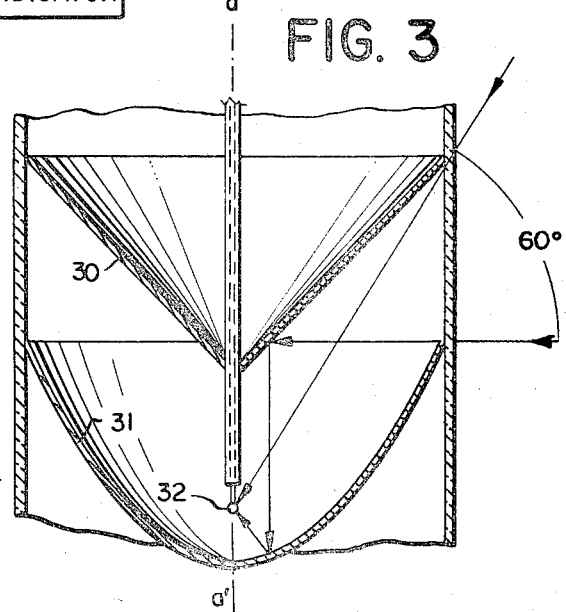

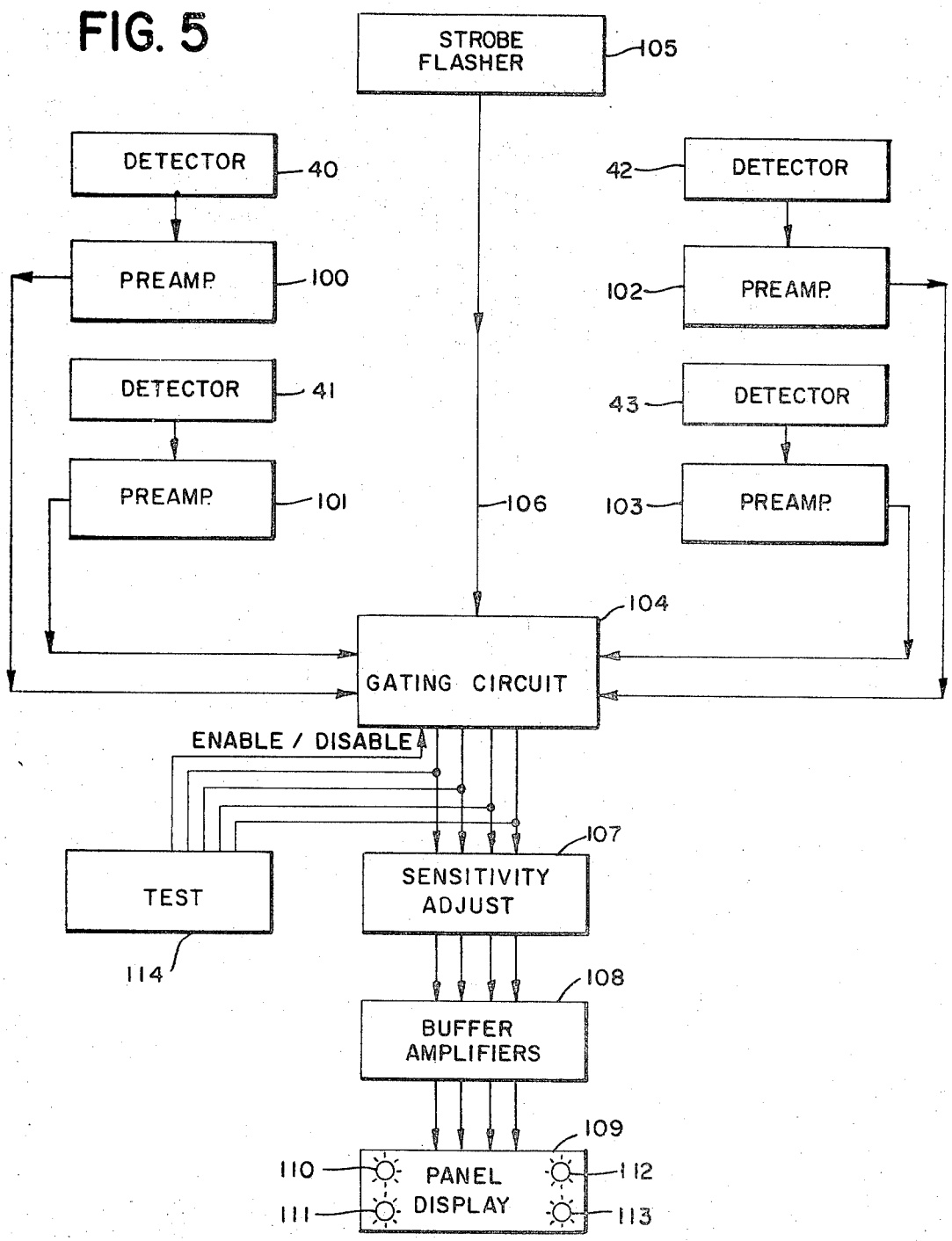

AIRCRAFT COLLISION WARNING SYSTEM WITH PANORAMIC VIEWING REFLECTORS

BACKGROUND OF THE INVENTION

This invention relates to aircraft warning systems, and more particularly to an aircraft warning system to be mounted on an aircraft and having panoramic means for detecting radiation emitted by other aircraft.

The growing number of commercial and private aircraft using the air space has significantly increased the danger of midair collisions and has emphasized the need for an efficient, low-cost aircraft warning system capable of alerting the pilot of an aircraft to the presence of nearby aircraft.

Warning systems in the prior art typically have included an infrared transmitter and a receiver operating together in a so-called "noncooperative" system in which a pilot warning indication is given only when the receiver detects infrared radiation corresponding to the radiation emitted by its associated transmitter. Hence a nearby aircraft from which a signal is not reflected adequately will pass undetected.

Furthermore, previously known aircraft warning systems have generally employed rotating radiation scanners driven by electric motors which generate electrical noise and interfere with aircraft communication and navigation equipment. The motor and its associated gearing are also apt to break down, and when the scanning mechanism fails the entire warning system fails.

The present invention provides a self-contained aircraft warning system which operates in a passive or "semicooperative" manner to detect light radiations (visible light, infrared or, ultraviolet) emitted by nearby aircraft. It does not rely upon the reflection of light from its own beacon by another aircraft. It does require other aircraft to be equipped with a strobe beacon or rotating beacon warning system. The warning system disclosed herein is extremely simple in design and requires no moving parts which might break down or interfere with other aircraft systems.

A panoramic reflector is provided in the system to receive radiations in a full 360° circle of azimuth about a central axis and to focus the radiations upon one or more radiation detectors. Electrical indicator means connected to the radiation detector give the pilot of the aircraft on which the apparatus is mounted a warning when such radiation is received. The panoramic reflector views continuously and completely about the horizontal plane so that no mechanical scanning apparatus is required. Moreover, the particular reflector arrangement taught herein is well adapted to the production of a wide range of aircraft warning indicators with panoramic fields of view having various angles of view above and below the horizontal plane. This last feature is particularly advantageous since the aircraft warning sensor will frequently be mounted in different positions on different types of aircraft. Thus, a sensing position at the top of a tail structure has a different optimal viewing pattern above and below the horizon from that of a sensor mounted under an aircraft fuselage.

When more than one radiation detector is positioned between the reflecting surfaces of the panoramic reflector, the system is capable of giving an indication of the relative direction of a detected aircraft. For example, four radiation detectors permit the indication of the quadrant relative to the aircraft's heading in which the detected aircraft is located. Thirty-six detectors give an indication of the 10° sector of arc relative to the aircraft's heading in which a detected aircraft is located.

Although the aircraft warning system of the present invention is primarily a receiver of radiation, one or more radiation sources can be advantageously combined integrally with the panoramic reflector and detector when further means are provided for inhibiting the electrical alarm indicator from responding to radiation emitted directly from such a source. In this arrangement both radiation receiver and beacon are conveniently combined in one unit. However, it should be remembered that the present warning system is basically passive and does not necessarily rely upon the reception of radiation originating from the aircraft's own beacon. Indeed, special provisions are made to prevent the indicator from responding directly to radiation emitted by the aircraft's own rotating beacons or strobe systems, as well as the embodiment described in FIG. 1.

SUMMARY OF THE INVENTION

The aircraft warning system of the present invention has panoramic reflector means for viewing in a continuous 360° circle of azimuth. The reflector means are adapted to be mounted on an aircraft and have a primary reflecting surface of revolution about a central axis and a concave secondary reflecting surface of revolution about the same axis. The coaxial reflecting surfaces face each other. At least one radiation detector is positioned on the central axis between the reflecting surfaces so that radiation transmitted from a location external to the reflector means is reflected from the primary reflecting surface onto the concave secondary reflecting surface, whence it is directed onto the radiation detector. Electrical alarm indicator means are connected to the detector to indicate the reception of radiation by the detector.

In one preferred configuration the warning system additionally comprises at least one radiation source mounted coaxially with the axis of the reflecting surfaces and adapted to radiate panoramically about the central axis, and inhibiting means for preventing the electrical indicator means from responding to direct radiation emitted from the source. These inhibiting means can be an opaque element positioned between the radiation source and reflector means whereby radiation emitted from the source is prevented from falling directly on the primary and secondary reflecting surfaces. Alternatively the inhibiting means can comprise gating means responsive to the energization of the radiation source for preventing the electrical alarm indicator means from indicating the detection of radiation by the detector while the source is energized.

These and further objects and advantages of the present invention will become apparent when the following description is read in connection with the accompanying drawings.

BRIEF DESCRIPTION OF THE DRAWING

FIG. 1 is an elevation view in section of a first embodiment of an aircraft warning apparatus in accordance with the present invention;

FIG. 2 is a schematic sectional illustration of the panoramic reflector of a second embodiment of the invention;

FIG. 3 is a schematic sectional illustration of the panoramic reflector of a third embodiment of the invention;

FIG. 4 is a perspective view of an array of four radiation detectors for use with the panoramic reflectors of FIGS. 1—3; and, FIG. 5 is a block diagram of an electrical alarm indicator system in accordance with the present invention.

DESCRIPTION OF THE ILLUSTRATED EMBODIMENTS

A first embodiment of aircraft warning apparatus in accordance with the present invention is shown in FIG. 1. A circular metal base 10, which is adapted to be mounted on an aircraft, supports and is attached to a cylindrical transparent plastic window element 11. The window element 11 advantageously has an optical filter coating which permits the element to pass only radiation within a desired spectral range. A first reflector element 12 is also mounted on the base 10, and a second reflector element 13 is bonded to the window element 11 and positioned over the reflector element 12, Reflector elements 12 and 13 may be advantageously formed of molded plastic and have primary and secondary reflecting surfaces 14 and 15, respectively, facing each other. The primary reflecting surface 14 in this embodiment is a surface of revolution about the central axis $aa'$ which passes perpendicularly through the center of the circular base 10. The surface 14 is inversely parabolic, and by this is meant that it can be defined by the rotation of a section of an inverted parabola about the axis $aa'$. In other words, the surface is defined by the rotation of the plane curve $(x-h)^2 = y \times ky$ about the axis where $aa'$ where $x$ represents the radial distance of a point on the surface from the axis $aa'$, $y$ represents the projection of the point along the axis, and both $h$ and $k$ are constants.

The secondary reflecting surface 15 is a concave paraboloid defined by the revolution of a parabola $y^2 = -mx$ about the central axis $aa'$. Here $x$ and $y$ represent the same parameters as above, and $m$ is a constant. Surfaces 14 and 15 are made reflective by the vacuum depositon of thin layers of aluminum thereon.

A radiation detector 16 is mounted at the end of a hollow support post 17 which is inserted through a central hole in the base 10 and the reflector element 12. Two electrical leads 18 from the detector 16 pass through the hollow post 17 for connection to electrical indicator means shown schematically by the block 19. In its simplest form the indicator means is merely a light on the aircraft's control panel which is turned on when the detector 16 receives radiation above a threshhold value.

The radiation detector 16 is supported on the axis $aa'$ at the focal point of the paraboloid secondary reflecting surface 15. The detector 16 in FIG. 1 and the other detectors appearing in the drawing can be any one of several commercially available photodiodes, phototransistors, or other photosensitive devices optically responsive to the spectral emission of presently used aircraft anticollision lights, whether such lights are rotating red beacons or flashing white strobe lights. A broad spectrum sensor can be employed to detect not only the anticollision lights mentioned above but also infrared emissions from aircraft engines or from compound semiconductor lasers of the gallium arsenide variety.

The primary and secondary reflecting surfaces 14 and 15 shown in FIG. 1 provide a panoramic reflector for focusing light from all directions in azimuth about the axis $aa'$ onto the radiation detector 16. Light transmitted from another aircraft, for example, which is within the angle of view of the reflector falls upon the primary reflecting surface 14 and is reflected to the secondary reflecting surface 15 which focuses it onto the detector 16. The vertical angle of view for the panoramic reflector in FIG. 1 is on the order of 125°.

FIGS. 2 and 3 illustrate two other panoramic reflector configurations provided by the present invention. In FIG. 2 a primary reflecting surface 20 is inversely spherical, i.e., it is described by the rotation of the plane curve $x^2 + y^2 = px$ about a central axis $aa'$, where $x$ and $y$ are as described above, and $p$ is a constant. A secondary reflecting surface 21 is a concave paraboloid as in the embodiment of FIG. 1, and a radiation detector 22 is positioned at or near its focal point on the central axis $aa'$. The vertical angle of view of the panoramic reflector having this arrangement of reflecting surfaces is on the order of 110°.

In the panoramic reflector of FIG. 3 a conical primary reflecting surface 30 is provided. This is formed by the rotation of a straight line at, for example, a 45° angle about the central axis $aa'$. A secondary reflecting surface 31 is concavely paraboloidal, defined by the rotation of a parabola about the axis $aa'$. A radiation detector 32 is positioned on the axis $aa'$ in proximity to the focal point of the concave secondary reflecting surface 31. It will be noted that in this embodiment the concave secondary reflecting surface is disposed beneath, rather than above the primary reflecting surface. This invention encompasses the use of either reflector arrangement, i.e., with the secondary reflecting surface to facing downwardly over the primary reflecting surface, or vice versa. The reflector depicted in FIG. 3 has a vertical angle of view of approximately 60°.

Exact dimensions for the panoramic reflectors shown in FIGS. 1—3 are not given since it will be understood that such dimensions are not critical in the overall operation of the present invention. It will be perceived, however, that variation in the constants of the equations defining the reflecting surfaces of revolution and in their relative spacing produces a wide range of panoramic reflectors having various viewing aspects or vertical angles of view above and below the horizontal plane. In general, for given reflector dimensions, when the secondary reflecting surface is a paraboloid the use of a concave primary reflecting surface tends to expand the vertical angle of view; a convex primary reflecting surface minimizes the vertical viewing aspect of the panoramic reflector. This flexibility in optical characteristics is particularly valuable in this aircraft warning system since the panoramic reflector can be mounted at different positions on different aircraft and each such location has its own optimal viewing aspect.

Moreover, although the secondary reflecting surface in the illustrated embodiments is a concave paraboloid with a precise focal point on the central axis, other concave secondary reflecting surfaces of revolution can be employed successfully in the panoramic reflector to concentrate radiation reflected from a primary reflecting surface onto one or more detectors.

An array of four radiation detectors 40—43 positioned about a central axis $aa'$ is shown in FIG. 4. As noted above, a plurality of radiation detectors can be readily substituted for the single detector depicted in each of the illustrated embodiments. The use of four radiation detectors arranged in a horizontal plane at or near the focal point of the secondary reflecting surface permits the identification of the particular quadrant relative to the heading of the aircraft in which a detected aircraft is located. Similarly, 36 radiation detectors grouped horizontally near the focus of the secondary reflecting surface result in an aircraft warning system with the ability to pinpoint the azimuth of a detected aircraft to one of 36 10° sectors about the central axis. Opaque masking means such as the four intersecting opaque plates 44—47 in FIG. 4 may be required to limit the radiation received by each of the detectors 40—43 to a predetermined angle of view about the central axis $aa'$.

The aircraft warning sensor arrangement already described is advantageously coupled with one or more aircraft beacons in an integral package. Returning to FIG. 1, the panoramic reflector shown there is surmounted by a circular metal support plate 50 to which is attached a xenon strobe lamp 51 and a bracket 52 supporting a circular array of 18 gallium arsenide laser diodes 53. A transparent plastic hemispherical dome 54 rests on an opaque gasket 55 and is fixed to the support plate 50 to enclose the two radiation sources 51 and 53.

The xenon strobe lamp 51 when energized with an appropriate power source (not shown) produces a visible light output and also a very intense spectral line in the infrared at 0.9 micron wavelength. When properly energized energized the gallium arsenide laser diode array 53 emits infrared light energy of approximately 0.94 micron wavelength. This energy is radiated omnidirectionally about the axis $aa'$ due to the use of 18 discrete laser diodes each having a radial beam spread of approximately 20° or more.

At present the use of rotating beacons or strobe lights is discouraged or prohibited in aircraft flying under poor visibility conditions since the repetitious flashing light reflected from clouds tends to distract the pilot. The use of a gallium arsenide laser diode beacon solves this problem because the infrared radiation emitted by such a source is not visible to the human eye, but it can be readily sensed by an uncooled silicon radiation detector.

A block schematic diagram of an electrical indicator in accordance with the present invention appears in FIG. 5. The indicator arrangement shown there envisions the use of the integral beacon-sensor configuration shown in FIG. 1 but having the four radiation detectors of FIG. 4 substituted for the single detector 16. Each of the detectors 40—43 is electrically connected to its corresponding preamplifier 100—103, respectively.

Preamplifiers 100—103 amplify the signals received from the detectors 40—43 and also filter out slowly changing signals so that only signals having fast rise and fall times are amplified. This filtering operation tends to eliminate all light signals not generated by the flashing beacons or other aircraft. The filtered and amplified outputs of circuits 100—103 are connected to a sampling and gating circuit 104.

A strobe flasher 105 is a multivibrator which periodically triggers or energizes the xenon strobe lamp at a flashing rate of 90 per minute. The circuit also generates a gating signal 106 during the time the lamp is emitting radiation. The gating signal 106 is connected to the sampling and gating circuit 104.

The sampling and gating circuit 104 passes each of the four light signals from preamplifiers 100—103 except when the gating signal 106 is present. The gated light signals are transmitted to a sensitivity adjustment circuit 107 which regulates the amplitude of the gated signals. The four signals are then further amplified by buffer amplifiers 108 and delivered to a panel display 109.

The panel display 109 is located on the control panel of the aircraft and consists of four lamps 110—113 arranged to denote the four quadrants relative to the heading of the aircraft. The lighting of a lamp in the display indicates the reception of a light signal by the radiation detector scanning the corresponding quadrant. Additional warning displays such as buzzers, horns, or flashing lights can also be employed.

A test unit 114 is provided to generate one or more signals simulating the gated light signals in order to test the operation of the panel display 109. The test signals are connected to the input of the sensitivity adjustment circuit. In another test operation light from the aircraft's beacon is conducted through a fibre optics light conduit shown at 115 in FIG. 4 onto each of the warning system's radiation detectors (only one illustrated). This acts as a positive check on the effectiveness of the gating circuitry since no lamp in the panel display should be energized if the gating circuitry is functioning properly. The test unit 114 also provides for disabling the gating circuitry by switch action so that the detection of light piped through the conduit 115 can be indicated on the panel display 109 and thereby provide a check to assure the operator that the entire warning system is operating satisfactorily.

When one or more aircraft beacons is integrally mounted with the panoramic reflector of the present invention an inhibiting means is required for preventing the system's indicator from responding to light emitted by the aircraft's own beacon. Thus the opaque gasket 55 in FIG. 1, together with the support plate 50 and the reflector element 13, combine to prevent light emitted by either of the beacons 51 and 53 from falling directly on the reflecting surfaces 14 and 15 and being detected. The more elaborate inhibiting means provided by the flasher circuit 105 and gating circuit 104 in FIG. 5 also serve to prevent the pilot's warning display from indicating the reception of light emitted by the aircraft's own beacon.

Details of the electronic circuitry needed to realize the electrical indicator means of FIG. 5 have not been provided since such circuitry is well known by those skilled in the electronic engineering art.

It will be understood that various changes in the details, materials, steps and arrangement of parts which have been herein described and illustrated in order to explain the nature of the invention can be made by those skilled in the art within the principle and scope of the invention as expressed in the appended claims.

I claim:
1. An aircraft warning system comprising:
   a. panoramic reflector means adapted to be mounted on an aircraft, said reflector means having,
      1. a primary reflecting surface of revolution about a central axis, and
      2. a concave secondary reflecting surface of revolution about said central axis facing said primary reflecting surface;
   b. at least one radiation detector positioned on said central axis between said primary and secondary reflecting surfaces so that radiation transmitted from a location external to the reflector means is reflected from the primary reflecting surface, onto the concave secondary reflecting surface, whence it is directed onto the radiation detector; and
   c. electrical indicator means connected to said detector for indicating the detection of radiation by said detector.

2. An aircraft warning system according to claim 1 wherein said concave secondary reflecting surface has a focal point on said central axis and at least one radiation detector is positioned at said focal point.

3. An aircraft warning system according to claim 1 wherein said primary reflecting surface is inversely parabolic and said secondary reflecting surface is parabolic.

4. An aircraft warning system according to claim 1 wherein said primary reflecting surface is inversely spherical and said secondary reflecting surface is parabolic.

5. An aircraft warning system according to claim 1 wherein said primary reflecting surface is conical and said secondary reflecting surface is parabolic.

6. An aircraft warning system according to claim 1 having a plurality of radiation detectors positioned in proximity to said central axis between the primary and secondary reflecting system.

7. An aircraft warning system according to claim 6 further comprising masking means for limiting the radiation receivable by each of the detectors to a predetermined angle of view about the central axis.

8. An aircraft warning system according to claim 1 further comprising filter means for limiting the light reflected from at least one of the reflecting surfaces to a predetermined spectral range in which range the detector is capable of responding.

9. An aircraft warning system according to claim 1 further comprising:
   a. at least one radiation source mounted coaxially with said reflecting surfaces and adapted to radiate panoramically about the central axis, and
   b. inhibiting means for preventing said electrical indicator means from responding to direct radiation emitted from said source.

10. An aircraft warning system according to claim 9 wherein said inhibiting means comprises an opaque element positioned between the radiation source and the reflector means whereby radiation emitted from said source is prevented from falling directly on said primary and secondary reflecting surfaces.

11. An aircraft warning system according to claim 9 wherein said inhibiting means comprises trigger means for energizing the radiation source, circuit means responsive to said trigger means for generating a gating signal while said source is energized, and gating means responsive to said gating signal for preventing the electrical indicator means from indicating the detection of radiation by the detector while said source is energized.

12. An aircraft warning system according to claim 9 wherein said radiation source is a xenon strobe lamp mounted integrally with said reflector means.

13. An aircraft warning system according to claim 9 wherein said radiation source is adapted to produce infrared radiation and said radiation detector is responsive to infrared radiation.

14. An aircraft warning system according to claim 13 wherein said radiation source comprises a plurality of gallium arsenide laser diodes positioned about the longitudinal axis so as to generate radiation omnidirectionally about said axis.